United States Patent [19]
Sanderson

[11] Patent Number: 5,011,178
[45] Date of Patent: Apr. 30, 1991

[54] TRAILER HITCH APPARATUS

[76] Inventor: Stanley W. Sanderson, 312 Sanderson Rd., Newport, N.C. 28570

[21] Appl. No.: 484,978

[22] Filed: Feb. 26, 1990

[51] Int. Cl.$^5$ .............................................. B60D 1/14
[52] U.S. Cl. .................................. 280/483; 280/489; 280/476.1
[58] Field of Search ............... 280/483, 486, 487, 489, 280/476.1, 476.2, 495, 406.1

[56] References Cited

U.S. PATENT DOCUMENTS

| | | | |
|---|---|---|---|
| 3,414,294 | 12/1968 | Moulton | 280/489 |
| 3,695,213 | 10/1972 | Littlefield | 280/489 |

FOREIGN PATENT DOCUMENTS

| | | | |
|---|---|---|---|
| 2609668 | 7/1988 | France | 280/483 |

Primary Examiner—Mitchell J. Hill
Attorney, Agent, or Firm—Leon Gilden

[57] ABSTRACT

An apparatus including a primary support tube mounting a trailer post pivotally thereon. A leaf spring pivotally mounted within the trailer mounting post is directed rearwardly of the primary support tube and mounted to a spring shackle adjacent an upper terminal end of the primary support tube. The trailer mounting post includes spaced parallel top and bottom walls including "U" shaped wall terminal ends to pivotally receive the forward end of the spring therewithin and permit pivotment of the trailer mounting post relative to the primary support tube to dampen vibration transmitted through the primary support tube to an associated trailer.

6 Claims, 5 Drawing Sheets

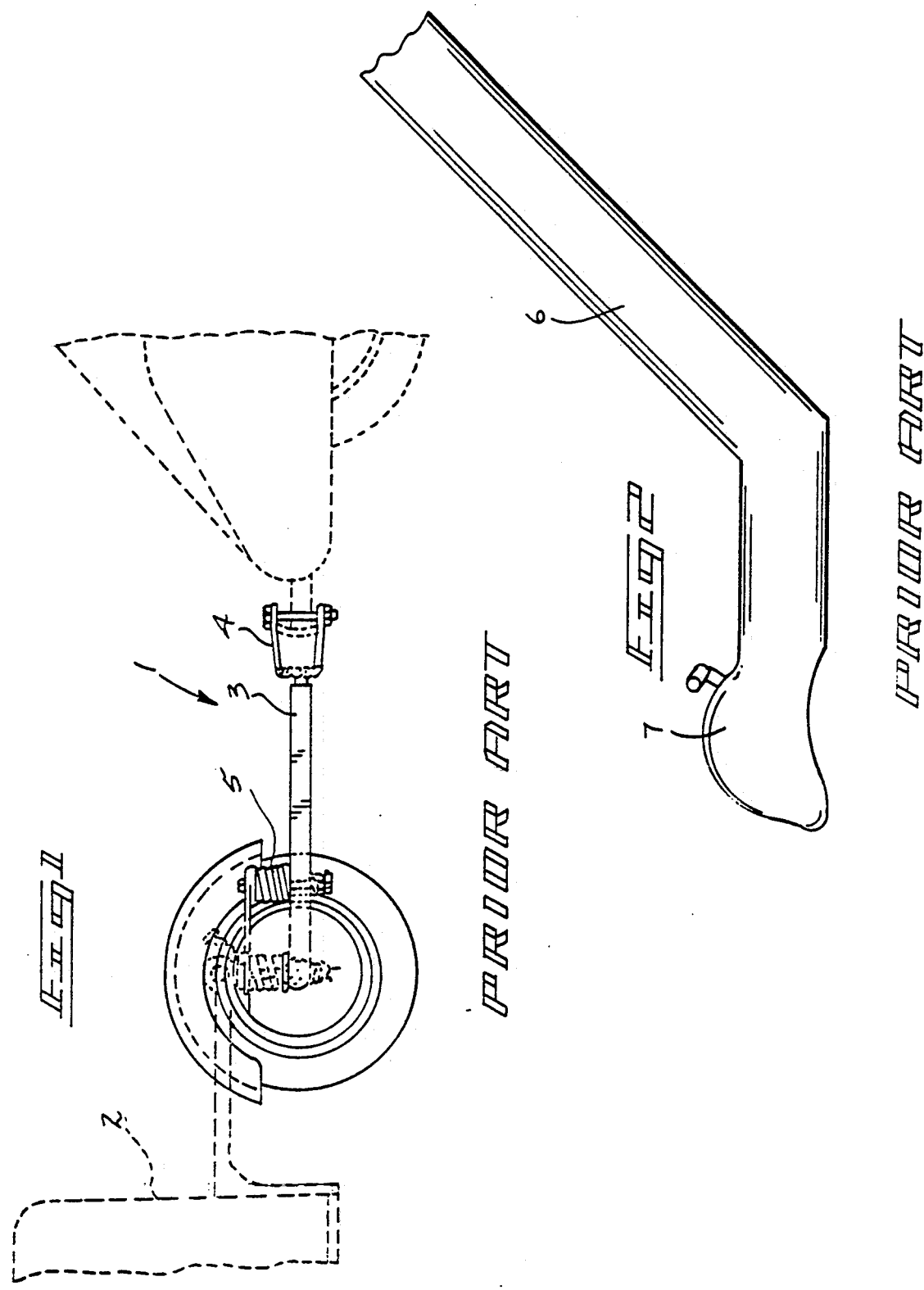

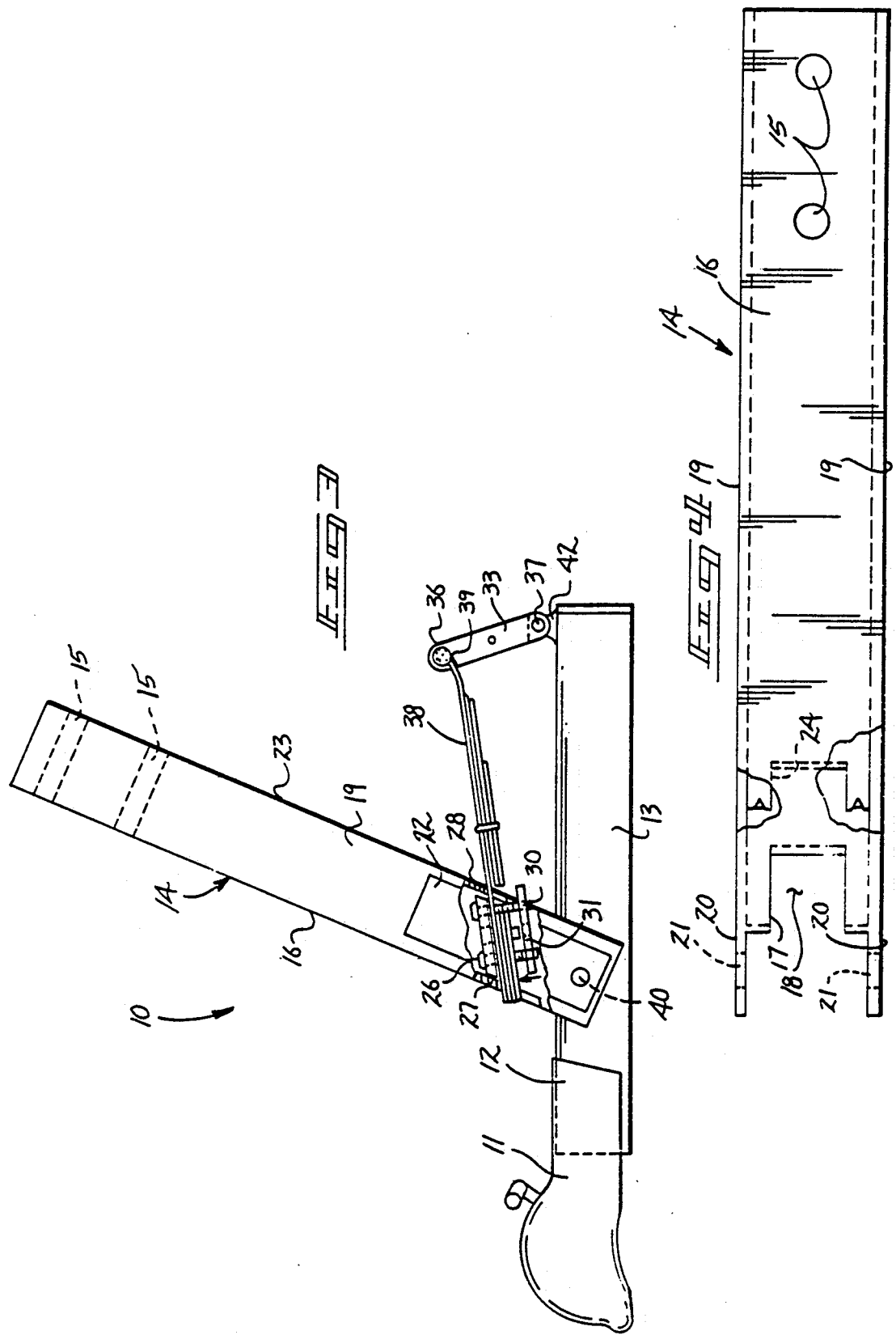

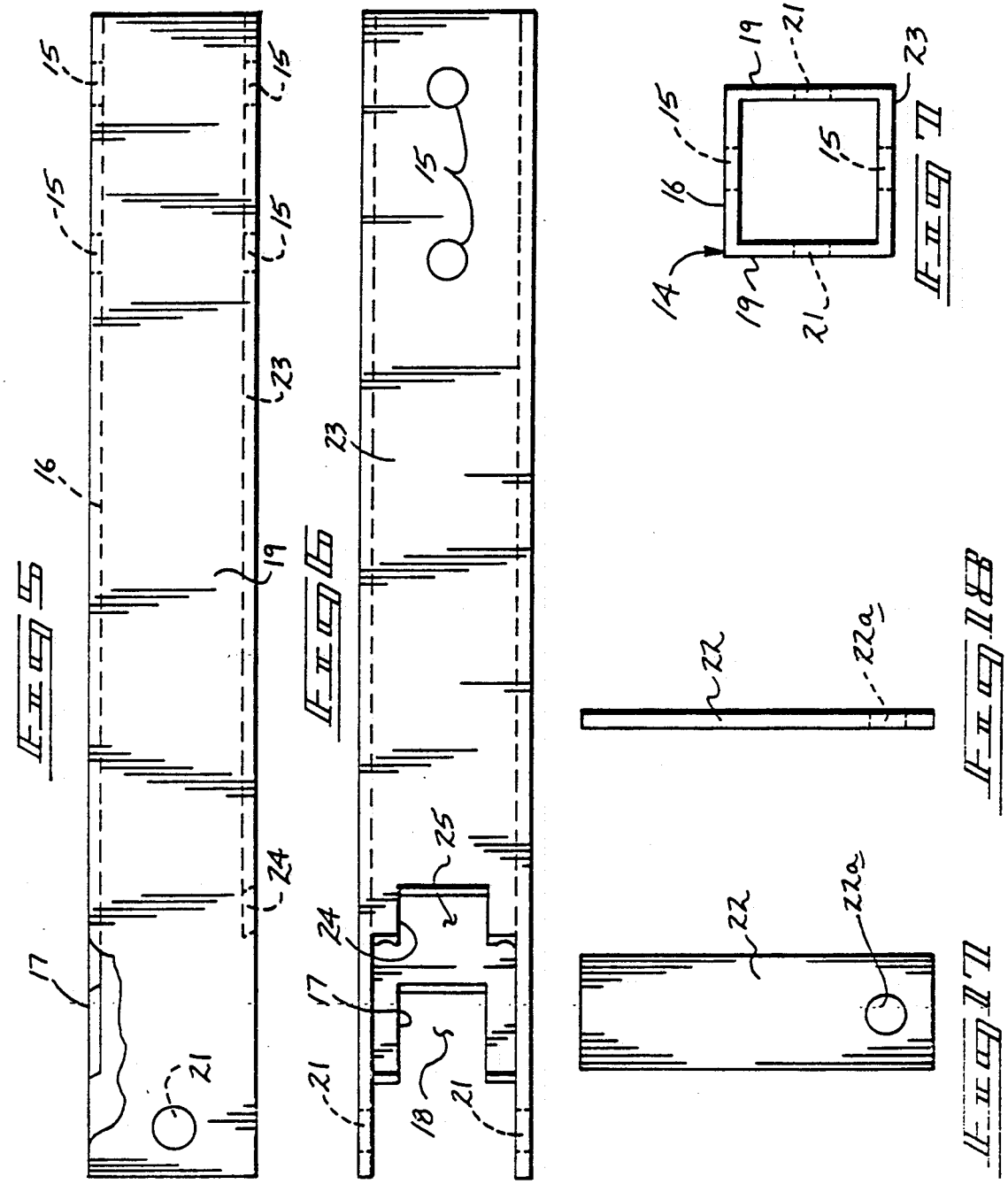

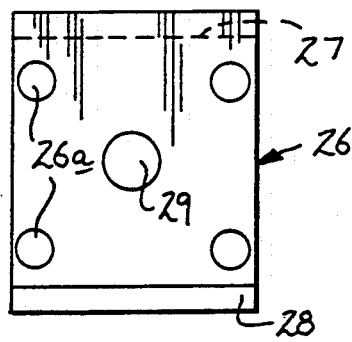
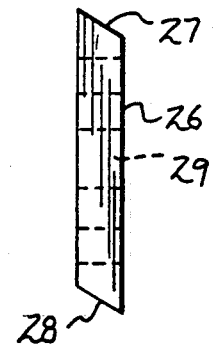
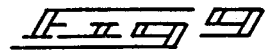
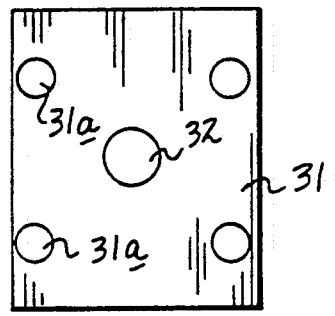
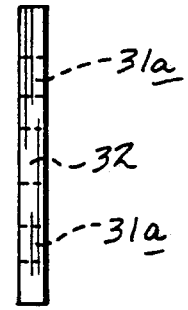
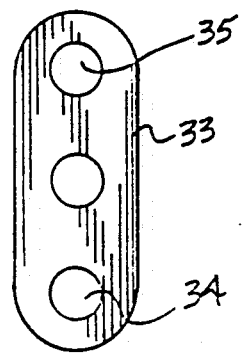
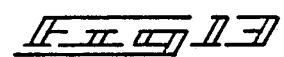
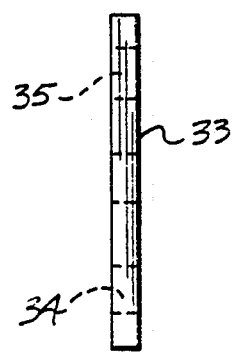

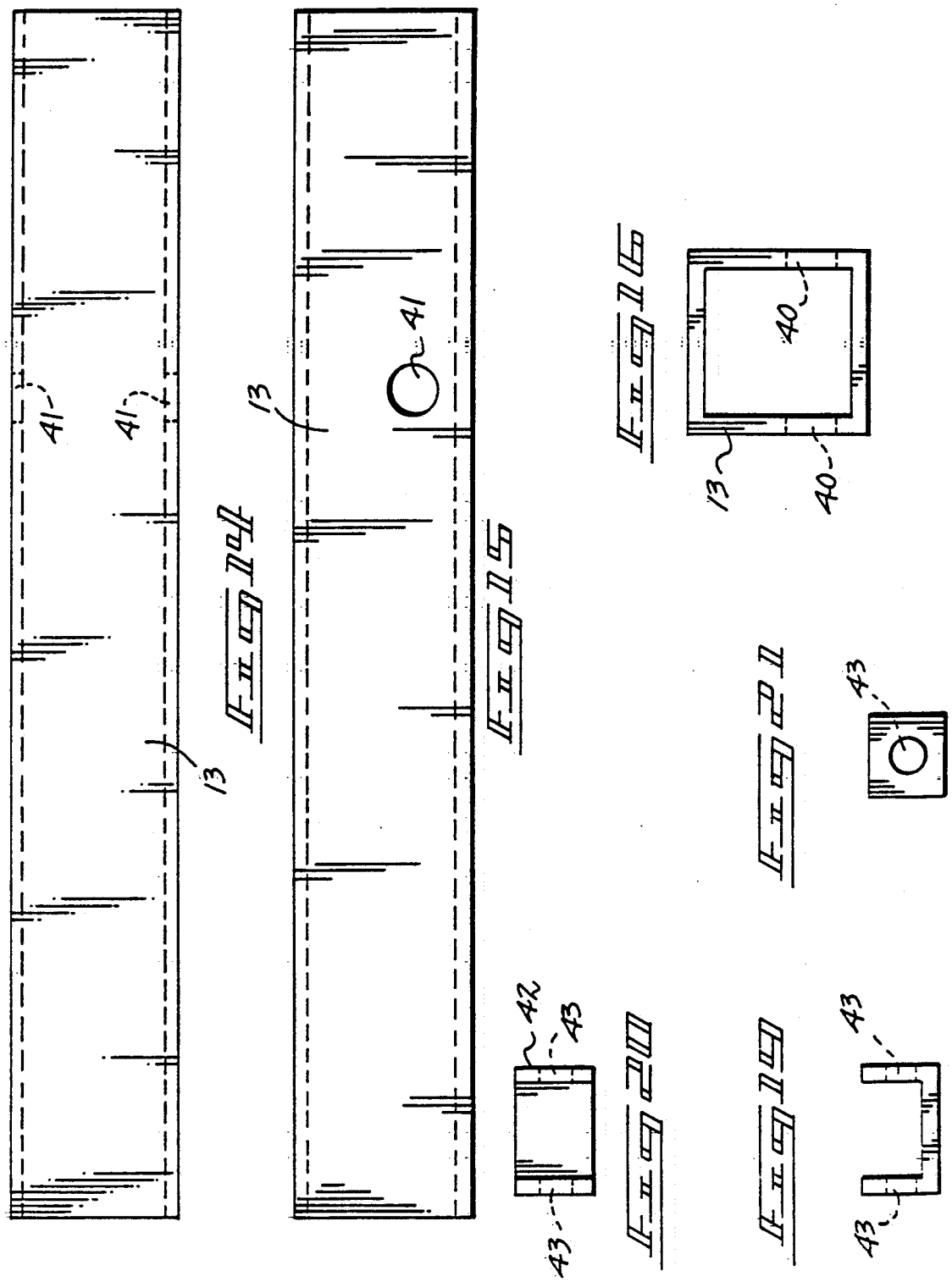

TRAILER HITCH APPARATUS

BACKGROUND OF THE INVENTION

1. Field of the Invention

The field of invention relates to trailer support apparatus, and more particularly pertains to a new and improved trailer hitch apparatus wherein the same permits dampening of vibration directed from a tow vehicle to an associated trailer.

2. Description of the Prior Art

Various trailer hitch organizations are provided in the prior art. Heretofore, however, when a vehicle pulls an associated trailer, and particularly in a "fifth-wheel" arrangement, vibratory dampening directed to the trailer relies wholly on the suspension of the tow vehicle associated with the trailering procedure. The prior art has heretofore failed to provide an effective and convenient dampening organization for a trailer hitch, as set forth by the instant invention, particularly in use with a "fifth-wheel" arrangement. Examples of the prior art include U.S. Pat. No. 3,984,123 to Gonzalez utilizing a trailer hitch arrangement mounted resiliently to the chassis to permit longitudinal movement of the trailer hitch arrangement to the chassis.

U.S. Pat. No. 2,506,718 to Grant utilizes a rearwardly setting bar utilized as a primary trailer hitch tube mounted at its rear and forward portions to springs to permit resilient mounting of a trailer. The primary support bar is mounted to a dolly to which the associated trailer is accordingly mounted.

U.S. Pat. No. 2,460,613 to Wahl utilizes a trailer hitch arrangement, or coupling, where an upper and lower plate are mounted to a bumper member of a tow vehicle, with the upper and lower plates resiliently biased towards one another.

As such, it may be appreciated that there continues to be a need for a new and improved trailer hitch apparatus wherein the same includes a spring-biased mounting of a trailer hitch support tube to permit flexure of the support tube relative to a primary support tube mounted to a tow vehicle and in this respect, the present invention substantially fulfills this need.

SUMMARY OF THE INVENTION

In view of the foregoing disadvantages inherent in the known types of trailer hitch apparatus now present in the prior art, the present invention provides a trailer hitch apparatus wherein the same utilizes a spring-biasing organization to dampen vibratory road shock directed from a tow vehicle to an associated trailer. As such, the general purpose of the present invention, which will be described subsequently in greater detail, is to provide a new and improved trailer hitch apparatus which has all the advantages of the prior art trailer hitch apparatus and none of the disadvantages.

To attain this, the present invention provides an apparatus including a primary support tube mounting a trailer post pivotally thereon. A leaf spring pivotally mounted within the trailer mounting post is directed rearwardly of the primary support tube and mounted to a spring shackle adjacent an upper terminal end of the primary support tube. The trailer mounting post includes spaced parallel top and bottom walls including "U" shaped wall terminal ends to pivotally receive the forward end of the spring therewithin and permit pivotment of the trailer mounting post relative to the primary support tube to dampen vibration transmitted through the primary support bue to an associated trailer.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer hitch apparatus which has all the advantages of the prior art trailer hitch apparatus and none of the disadvantages.

It is another object of the present invention to provide a new and improved trailer hitch apparatus which may be easily and efficiently manufactured and marketed.

It is a further object of the present invention to provide a new and improved trailer hitch apparatus which is of a durable and reliable construction.

An even further object of the present invention is to provide a new and improved trailer hitch apparatus which is susceptible of a low cost of manufacture with regard to both materials and labor, and which accordingly is then susceptible of low prices of sale to the consuming public, thereby making such trailer hitch apparatus economically available to the buying public.

Still yet another object of the present invention is to provide a new and improved trailer hitch apparatus which provides in the apparatuses and methods of the prior art some of the advantages thereof, while simultaneously overcoming some of the disadvantages normally associated therewith.

Still another object of the present invention is to provide a new and improved trailer hitch apparatus wherein the same dampens vibratory shock directed through a tow vehicle to an associated trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a prior art trailer hitch apparatus.

FIG. 2 is an orthographic view of a further example of a prior art trailer hitch for use with a "fifth-wheel" organization.

FIG. 3 is an orthographic side view taken in elevation of the instant invention.

FIG. 4 is a top orthographic view of the secondary support tube of the instant invention.

FIG. 5 is an orthographic side view taken in elevation of the secondary support tube of the instant invention.

FIG. 6 is an orthographic bottom view of the secondary support tube of the instant invention.

FIG. 7 is an orthographic end view of the secondary support tube of the instant invention.

FIG. 8 is an orthographic top view of the top spring plate of the instant invention.

FIG. 9 is an orthographic side view of the top spring plate of the instant invention.

FIG. 10 is an orthographic top view of the bottom spring plate of the instant invention.

FIG. 11 is an orthographic side view of the bottom spring plate of the instant invention.

FIG. 12 is an orthographic top view of a shackle plate of a pair shackle plates utilized by the instant invention.

FIG. 13 is an orthographic side view of the shackle plate of FIG. 12.

FIG. 14 is an orthographic top view of the primary support tube of the instant invention.

FIG. 15 is an orthographic side view of the primary support tube of the instant invention.

FIG. 16 is an orthographic end view of the primary support tube of the instant invention.

FIG. 17 is an orthographic top view of the reinforcing plate utilized with the secondary support tube of the instant invention.

FIG. 18 is an orthographic side view of the reinforcing plate, as illustrated in FIG. 17.

FIG. 19 is an orthographic end view of the shackle support base utilized by the instant invention.

FIG. 20 is a top orthographic view of the shackle support base, as illustrated in FIG. 19.

FIG. 21 is an orthographic side view of the shackle support base, as illustrated in FIG. 19.

DESCRIPTION OF THE PREFERRED EMBODIMENT

With reference now to the drawings, and in particular to FIGS. 1 to 21 thereof, a new and improved trailer hitch apparatus embodying the principles and concepts of the present invention and generally designated by the reference numeral 10 will be described.

FIG. 1 illustrates a prior art trailer hitch apparatus 1 wherein a "U" shaped trailer bar is mounted to a tow vehicle, with a rearwardly extending dolly 3 mounted to a plurality of spaced wheels by coil springs to provide dampening to a rearwardly associated trailer 2. FIG. 2 illustrates a typical "fifth-wheel" trailer hitch arrangement utilized by the prior art, wherein a first "L" shaped leg 6 includes a socket 7 for securement to a conventional trailer ball mounted to an associated tow vehicle (not shown).

More specifically, the trailer hitch apparatus 10 of the instant invention essentially comprises a trailer ball socket 11 aligned with a socket support tube 12 that is mounted to and aligned integrally with a primary elongate support tube 13 of a generally rectangular, cross-sectional configuration. The primary support tube 13 pivotally mounts a secondary support tube 14 thereto which performs a function as a trailer post mounting support, including spaced parallel securement apertures 15 directed through top and bottom walls 16 and 23 respectively of the primary support tube. The top wall 16 (see FIG. 4) includes a "U" shaped forward end defining a top wall rectangular recess 18 that is spaced rearwardly a predetermined spacing from the spaced parallel side walls 19 that extend forwardly of the "U" shaped forward end 17. The side walls 19 include forward aligned flanges 20 that extend beyond the "U" shaped forward end 17 and include coaxially aligned forward flange apertures 21 to receive the pivot pin 40 that pivotally mounts the secondary support tube to the primary support tube, as illustrated in FIG. 3. Mounted to the side walls 19 are reinforcing plates 22 (see FIGS. 17 and 18) that each include reinforcing plate apertures 22a aligned with the forward flange apertures 21 of the side walls 19.

The bottom wall 23 aligned parallel and spaced from the top wall includes a bottom wall "U" shaped forward end 24 that is positioned rearwardly of the top wall "U" shaped forward end 17 a distance greater than the predetermined spacing to accommodate a rearward inclination of the secondary support tube relative to the primary support tube to define an acute included angle therebetween, as a spring pack 38 is mounted within the hollow cavity of the secondary support tube and extends through the bottom wall "U" shaped forward end 24, as illustrated in FIG. 3. The reinforcing plates 22 provide required rigidity to the bottom portion of the secondary support tube and to restore lost strength to the tube effected by the "U" shaped recesses 17 and 23. The spring pack 38 is maintained within the secondary support tube by a top spring plate 26 defined by a trapezoidal cross-sectional configuration, including a forward sloping end wall parallel to a rear sloping end wall 28 that are in turn inclined non-orthogonally to the top and bottom surfaces of the top spring plate 26 to thereby position the forward and rear end walls 27 and 28 in a somewhat spaced parallel relationship to interior surfaces of the top and bottom walls 16 and 23 as the tube 14 is in its inclined orientation. Top fastener apertures 26 mount threaded fasteners therethrough, with a spring registration bore 29 positioned medially of the top spring plate mounted to a spring positioning lug (a boss) (not shown). A bottom spring plate 31 is formed with a series of bottom spring plate apertures 31a to receive the fasteners 30 directed through the fastener apertures 26 of the top spring plate. The bottom spring plate 31 includes a bottom spring registration aperture 32 positioned medially thereof to fixedly mount the bottom spring plate in a predetermined registration relative to the spring pack 38 utilizing a spring positioning lug (or boss) as illustrated in FIG. 3.

The rear terminal end of the spring 38 includes a rolled rear end 39 mounted about a spring pin 36 that in turn is directed through spaced coaxially aligned top pin securement apertures 35 directed through spaced spring shackles 33 (see FIG. 3). The bottom pivot aperture 34 parallel to and spaced from the top securement aperture 35 receives a pivot pin 37 to pivotally mount the rear terminal end of the spring in a spaced pivotal relationship relative to the rear terminal end of the primary support tube. The primary support tube includes a pair of spaced and coaxially aligned pivot pin apertures 41 directed through side walls of the primary support tube to receive the pivot pin 40 and the forward flanges 20 of the secondary support tube. The pivot pin 37 of the spring shackles is mounted to a "U" shaped shackle base 42, including base apertures 43 coaxially aligned relative to one another through the legs of the "U" shaped shackle base 42, and wherein the shackle base is fixedly mounted through mechanically or welding techniques to the rear terminal end of the primary support tube.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch apparatus comprising, in combination,
   a trailer ball socket mounted to and integrally aligned with a socket support tube, the socket support tube coextensive with and mounted in an aligned relationship to a primary support tube at its forwardmost end, the primary support tube pivotally receiving a secondary support tube rearward of the socket support tube, and
   a pivot pin transversely directed through spaced side walls of the primary support tube and is directed through spaced forward flanges of the secondary support tube, and
   a biasing means for biasing vibration directed through the trailer ball socket mounted at its forward end interiorly of the secondary support tube and at its rear end to the primary support tube, and
   wherein the secondary support tube includes a top wall spaced from and parallel to a bottom wall, the top wall including a "U" shaped forward end spaced rearwardly of the forward flanges, and the bottom wall including a bottom wall "U" shaped forward end spaced rearwardly of the "U" shaped forward end of the top wall to receive the biasing means therethrough.

2. An apparatus as set forth in claim 1 wherein the biasing means comprises a spring pack, the spring pack including a top plate and a bottom plate sandwiching the spring pack therebetween, the top plate of a generally trapezoidal configuration captured interiorly of the secondary support tube, and wherein the spring pack is directed through the bottom wall "U" shaped forward end, and the bottom "U" shaped forward end is spaced in a confronting relationship relative to a rear terminal end of the spring pack, the rear terminal end of the spring pack including a shackle member mounting the rear terminal end of the spring pack to a rear terminal end of the primary support tube.

3. An apparatus as set forth in claim 2 wherein the shackle member includes spaced parallel plates, the spaced parallel plates each including coaxially aligned top spring apertures and coaxially aligned bottom spring apertures, the top spring apertures including a spring pin securing the rear terminal end of the spring pack to the shackle member, and the bottom spring apertures including a pivot pin, the pivot pin mounting the shackle member to the rear terminal end of the primary support tube.

4. An apparatus as set forth in claim 3 further including a "U" shaped shackle base, the "U" shaped shackle base including spaced parallel sides with shackle base apertures coaxially aligned through the sides relative to one another and receiving the pivot pin of the shackle member therethrough, wherein the shackle base is mounted in a fixed relationship relative to the rear terminal end of the primary support tube.

5. An apparatus as set forth in claim 4 wherein the top spring plate and bottom spring plate each include a registration bore positioned medially and directed orthogonally through the top spring plate and bottom spring plate to secure and receive spring registration bosses therewithin to position the top and bottom spring plates relative to the spring pack, and further including threaded fasteners to secure the top spring plate to the bottom spring plate.

6. An apparatus as set forth in claim 5 including a pair of reinforcing plates integrally mounted to opposed sides of the secondary support tube extending from the forward flanges rearwardly overlying the spaced side walls and directed rearwardly of the top wall "U" shaped forward end and the bottom wall "U" shaped forward end to enhance rigidity of the secondary support tube.

* * * * *